(12) United States Patent
Watari et al.

(10) Patent No.: US 11,918,968 B2
(45) Date of Patent: Mar. 5, 2024

(54) LIGHT IRRADIATION APPARATUS

(71) Applicant: Cellsystem Co., Ltd., Yokohama (JP)

(72) Inventors: Osamu Watari, Yokohama (JP); Kenta Tono, Yokohama (JP)

(73) Assignee: CELLSYSTEM CO., LTD., Yokohama (JP)

( * ) Notice: Subject to any disclaimer, the term of this patent is extended or adjusted under 35 U.S.C. 154(b) by 335 days.

(21) Appl. No.: 17/095,472

(22) Filed: Nov. 11, 2020

(65) Prior Publication Data

US 2021/0138427 A1 May 13, 2021

(30) Foreign Application Priority Data

Nov. 12, 2019 (JP) .................................. 2019-204514

(51) Int. Cl.
  *B01J 19/12* (2006.01)
  *B01J 19/28* (2006.01)
  *G02B 27/30* (2006.01)

(52) U.S. Cl.
  CPC ........... *B01J 19/122* (2013.01); *B01J 19/127* (2013.01); *B01J 19/28* (2013.01); *B01J 2219/1203* (2013.01); *G02B 27/30* (2013.01)

(58) Field of Classification Search
  CPC .............. B01J 19/122; B01J 2219/1203; B01J 2219/1215; B01J 19/127; B01J 19/28; B01J 19/121; B01J 19/123; G02B 27/30
  See application file for complete search history.

(56) References Cited

U.S. PATENT DOCUMENTS 5,037,676 A * 8/1991 Petropoulos .......... B05B 3/1064
  427/377
5,184,020 A * 2/1993 Hearst .................... B01J 19/123
  422/186

(Continued)

FOREIGN PATENT DOCUMENTS

CN    101947426 A      1/2011
CN    105353070 A  *   2/2016

(Continued)

OTHER PUBLICATIONS

Qiang Li et al., "Rapid degradation of tetrabromobisphenol A under the UV/TiO2/KPS systems in alkaline aqueous solutions", Oct. 2018, Springer Nature, (Year: 2018).*

(Continued)

*Primary Examiner* — Joshua L Allen
(74) *Attorney, Agent, or Firm* — McCoy Russell LLP

(57) ABSTRACT

An object is to provide a light irradiation apparatus irradiating a light to a sample in a reaction vessel while stirring the sample more efficiently. A rotating stage can rotate around a first axis that is a central axis thereof. A holding mechanism holds reaction vessels whose longitudinal directions are a direction of the central axis on a circumference around the first axis on the rotating stage at equal intervals. Rotation mechanisms hold bottoms of the reaction vessels and rotate the reaction vessels around second axes that are central axes of the reaction vessels, respectively. A light irradiation mechanism is disposed on the rotating stage and irradiates a light emitted from at least one light emitting diode to the reaction vessels from a predetermined direction.

11 Claims, 9 Drawing Sheets

(56) References Cited

U.S. PATENT DOCUMENTS

| | | | |
|---|---|---|---|
| 7,001,708 B1* | 2/2006 | Belfield | G03F 7/2053 |
| | | | 430/945 |
| 7,504,130 B1* | 3/2009 | Misra | C01G 23/047 |
| | | | 427/213.3 |
| 9,395,238 B2* | 7/2016 | Runcie | G01J 1/044 |
| 9,546,100 B2* | 1/2017 | Blatchley, III | C02F 1/32 |
| 2017/0031214 A1* | 2/2017 | Oh | G02F 1/133707 |
| 2017/0203272 A1* | 7/2017 | Chen | B01J 19/123 |
| 2019/0030510 A1* | 1/2019 | Taghipour | B01J 19/123 |

FOREIGN PATENT DOCUMENTS

| | | | | |
|---|---|---|---|---|
| CN | 105353070 A | | 2/2016 | |
| CN | 108883390 A | * | 11/2018 | ............ B01J 19/123 |
| EP | 0435577 A2 | * | 7/1991 | |
| JP | 2006519003 A | * | 8/2006 | |
| JP | 2017529236 A | | 10/2017 | |
| JP | 2018526024 A | * | 9/2018 | |
| KR | 20180023720 A | * | 3/2018 | |
| WO | WO-2016087779 A1 | * | 6/2016 | ............ C12M 21/02 |

OTHER PUBLICATIONS

Chen et al. (CN 105353070 A, Machine Translation) (Year: 2016).*
European Patent Office, Extended European Search Report Issued in Application No. 20206691.6, dated Apr. 20, 2021, Germany, 8 pages.
"Photocatalytic reactor," Korean Precision Instruments Website, Available Online at http://www.k-p-i.net/wp/wp-content/uploads/2017/02/photocatalystreactor.pdf, Available as Early as Feb. 2017, 3 pages.
"Photocatalytic reactor," Korean Precision Instruments Website, Available Online at http://www.k-p-i.net/product/photocatalystreactor/reaction, Retrieved on Nov. 11, 2020, Available as Early as Jan. 2017, 7 pages.

* cited by examiner

LIGHT IRRADIATION APPARATUS

CROSS REFERENCE TO RELATED APPLICATION

The present application claims priority to Japanese Patent Application No. 2019-204514, filed on Nov. 12, 2019. The entire contents of the above-listed application is hereby incorporated by reference for all purposes.

TECHNICAL FIELD

The present disclosure relates to a light irradiation apparatus, especially to a light irradiation apparatus irradiating a light to a reaction vessel.

BACKGROUND AND SUMMARY

A light irradiation apparatus irradiating a light to a reaction vessel such as a test tube that is filled with a sample is used in order to perform an experiment of photocatalytic reaction or reaction requiring light irradiation such as photocatalytic reaction. For example, an apparatus irradiating ultraviolet ray emitted from a mercury lamp to the sample in the test tube has been well known ("Photocatalytic Reaction Apparatus", Koike Precision Instruments, URL: http://www.k-p-i.net/product/photocatalystreactor/reaction/, http://www.k-p-net/wp/wp-content/uploads/2017/02/photo-catalystreactor.pdf). This apparatus includes a plurality of test tubes arranged around the central mercury lamp and can simultaneously irradiate the ultraviolet ray to these test tubes. A cooling mechanism to flow cooling water is also disposed in the apparatus to remove heat generated by the mercury lamp.

Further, to avoid an effect due to the heat generated by the mercury lamp, a configuration in which the mercury lamp is replaced with a LED (Light Emitting Diode) has been proposed (Published Japanese Translation of PCT International Publication for Patent Application, No. 2017-529236). Since the LED generates much less heat than the mercury lamp, cooling with the cooling water is not necessary and air cooling is possible. Therefore, it is possible to miniaturize the cooling mechanism and thus to suppress the entire size of the apparatus.

A light-irradiation multi-sample parallel-reaction apparatus disclosed in Published Japanese Translation of PCT International Publication for Patent Application, No. 2017-529236 can avoid the effect of the heat generated by the mercury lamp in the photocatalytic reaction apparatus disclosed in "Photocatalytic Reaction Apparatus". However, since light sources are separately arranged to equally irradiate the lights to the reaction vessels, and this result in complexity of the mechanism including the light sources. Further, when the light source breaks down, it is difficult to replace the light source and maintainability may be poor.

The present disclosure has been made in view of the matters mentioned above and has an object is to provide a light irradiation apparatus including light irradiation mechanisms with a simple configuration and easy handling.

A first aspect of the present disclosure is a light irradiation apparatus including: a rotating stage configured to be rotatable around a first axis that is a central axis thereof; a holding mechanism configured to hold a plurality of reaction vessels on a circumference around the first axis on the rotating stage at equal intervals, a longitudinal direction of the reaction vessel being a direction of the central axis; a plurality of rotation mechanisms configured to hold bottoms of the reaction vessels and rotate the reaction vessels around second axes that are central axes of the reaction vessels, respectively; a plurality of light irradiation mechanisms arranged on a circumference outside of the rotating stage, at least one light emitting diode being disposed in each light irradiation mechanism; and a light irradiation mechanism disposed outside of the rotating stage and configured to irradiate a light emitted from at least one light emitting diode to the reaction vessels from a predetermined direction. Therefore, it is possible to irradiate the light to the reaction vessels with the light irradiation apparatus having a simple configuration.

A second aspect of the present disclosure is the light irradiation apparatus in which it is desirable that, in the above-described light irradiation apparatus, the light irradiation mechanism includes: a light source unit in which the at least one light emitting diode is disposed; and a mirror configured to reflect the light emitted from the light source unit and irradiate the reflected light to the reaction vessels. Therefore, it is possible to robustly irradiate the light emitted from the light irradiation mechanism to the reaction vessels.

A third aspect of the present disclosure is the light irradiation apparatus in which it is desirable that, in the above-described light irradiation apparatus, the light irradiation mechanism further includes a collimator configured to convert the light emitted from the light source unit into a parallel light and output the parallel light to the mirror. Therefore, it is possible to irradiate the light to the reaction vessels efficiently and with high illuminance.

A fourth aspect of the present disclosure is the light irradiation apparatus in which it is desirable that, in the above-described light irradiation apparatus, the at least one light emitting diode is disposed on a principal surface of the light source; and an optical axis of the light emitted from the light source unit matches a normal line passing through a center of a principal surface of the light source unit. Therefore, it is possible to robustly irradiate the light emitted from the light irradiation mechanism to the reaction vessels.

A fifth aspect of the present disclosure is the light irradiation apparatus in which it is desirable that, in the above-described light irradiation apparatus, two or more light emitting diodes are arranged on a third axis passing through the center and parallel to the first axis on the principal surface in the light source unit. Therefore, it is possible to irradiate the lights from the light emitting diodes to the reaction vessels in a well-balanced manner.

A sixth aspect of the present disclosure is the light irradiation apparatus in which it is desirable that, in the above-described light irradiation apparatus, the two or more light emitting diodes are symmetrically arranged with respect to the third axis and arranged on a fourth axis passing through the center of the principal surface and orthogonal to the third axis in the light source unit. Therefore, it is possible to irradiate the lights from the light emitting diodes to the reaction vessels in a well-balanced manner.

A seventh aspect of the present disclosure is the light irradiation apparatus in which it is desirable that, in the above-described light irradiation apparatus, the two or more light emitting diodes are arranged in a matrix in a direction of the third axis and a direction of the fourth axis in the light irradiation mechanism. Therefore, it is possible to irradiate the lights from the light emitting diodes to the reaction vessels in a well-balanced manner.

An eighth aspect of the present disclosure is the light irradiation apparatus in which it is desirable that, in the above-described light irradiation apparatus, when the two or more light emitting diodes are disposed in the light irradiation mechanism, emission wavelengths of the two or more light emitting diodes are the same as each other, emission wavelengths of the two or more light emitting diodes are different from each other, or the two or more light emitting diodes constitute a plurality of groups of light emitting diodes, the light emitting diodes included in each group having the same emission wavelength, emission wavelengths of the groups being different from each other. Therefore, it is possible to flexibly arrange the LED of the appropriate wavelength as appropriate.

A ninth aspect of the present disclosure is the light irradiation apparatus in which it is desirable that, in the above-described light irradiation apparatus, each reaction vessel revolves as the rotating stage rotates, and a revolution period is set to a value that is not a multiple of a rotation period. Therefore, it is possible to equally irradiate the light to the reaction vessels.

A tenth aspect of the present disclosure is the light irradiation apparatus in which it is desirable that, in the above-described light irradiation apparatus, the revolution period is set to a value other than a value obtained by adding 0.5 to the multiple of the rotation period. Therefore, it is possible to equally irradiate the light to the reaction vessels.

An eleventh aspect of the present disclosure is the light irradiation apparatus in which it is desirable that, in the above-described light irradiation apparatus, the revolution period is set to a value of an irrational number obtained by dividing the value by the rotation period. Therefore, it is possible to equally irradiate the light to the reaction vessels.

According to the present disclosure, it is possible to provide a light irradiation apparatus irradiating a light to a sample in a reaction vessel while stirring the sample more efficiently.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinbelow, exemplary embodiments of the present disclosure are explained with reference to the drawings. The same symbols are assigned to the same elements throughout the drawings and duplicated explanations are omitted as necessary.

First Exemplary Embodiment

Figure 1:
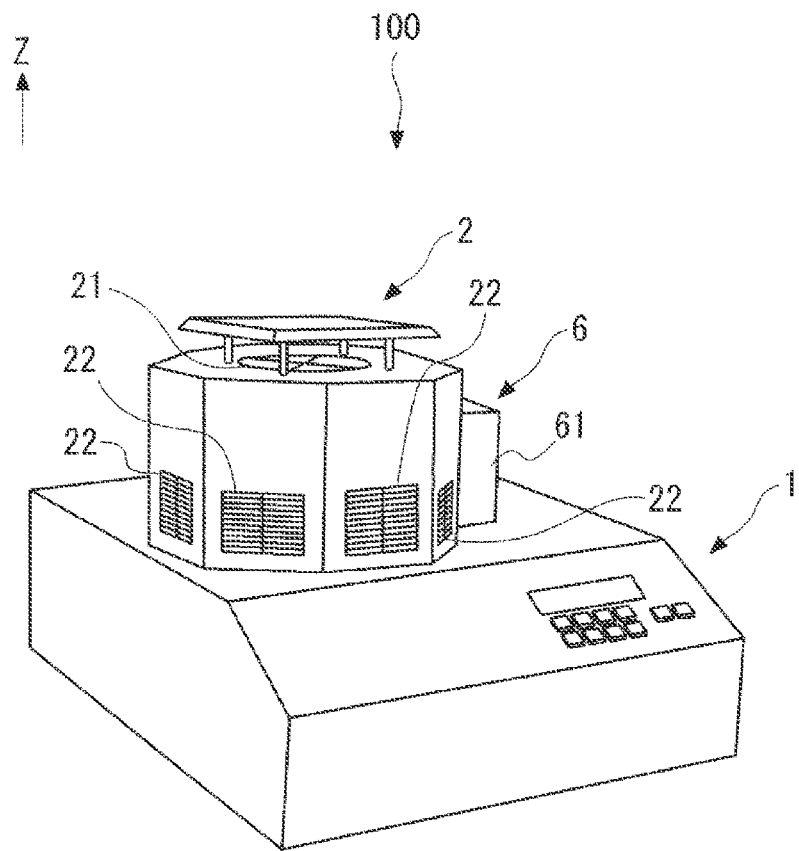
FIG. 1 schematically illustrates an appearance of a light irradiation apparatus according to a first exemplary embodiment.
Figure 2:
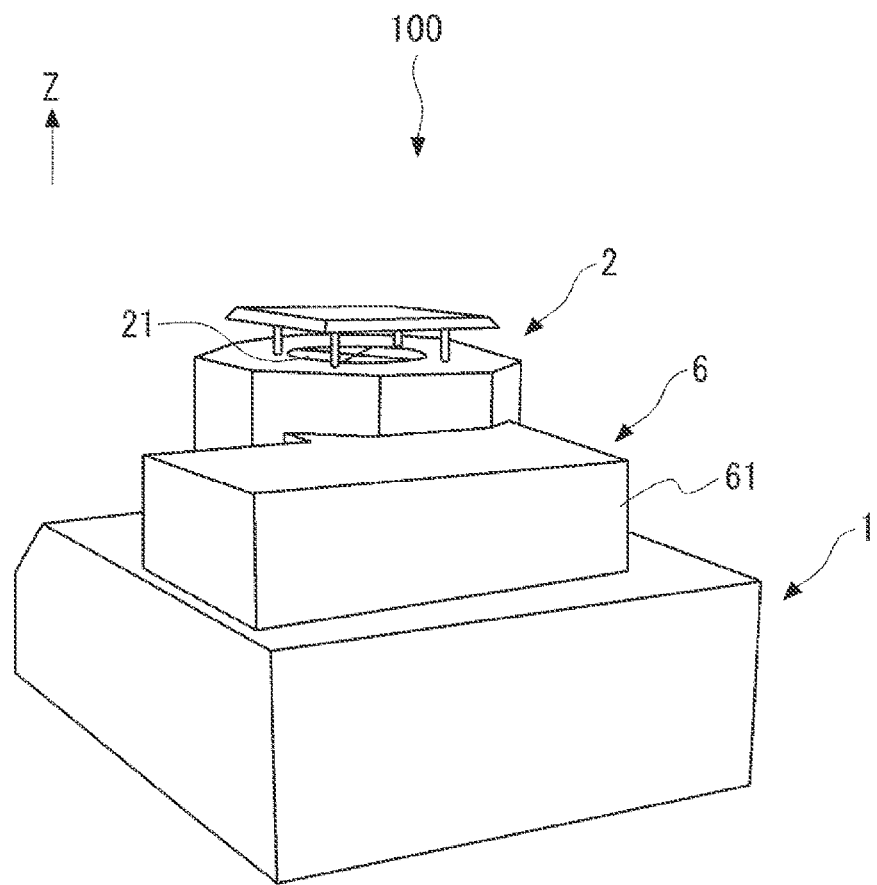
FIG. 2 schematically illustrates the appearance of the light irradiation apparatus according to the first exemplary embodiment when viewed from the back side.

A light irradiation apparatus 100 according to a first exemplary embodiment will be described. FIG. 1 schematically illustrates an appearance of the light irradiation apparatus 100 according to the first exemplary embodiment when observed from the front side. FIG. 2 schematically illustrates the appearance of the light irradiation apparatus 100 according to the first exemplary embodiment when observed from the back side. The light irradiation apparatus 100 is configured in such a manner that various mechanisms of a main body thereof disposed on a pedestal 1 are covered with a cover 2 that blocks light. Here, a rotating stage, a holding mechanism, a rotation mechanism, a light irradiation mechanism, and a stirring mechanism are included in the various mechanisms. A light irradiation mechanism 6 disposed on the back side of the cover 2 is connected to the cover 2 and a light from a light source unit disposed outside of the main body on the pedestal 1 is irradiated to the main body.

The light irradiation mechanism 6 is covered with a cover 61 preventing the light irradiated to the main body from leaking to the outside.

For example, the cover 2 includes a fan unit 21 and an exhaust port 22 for cooling internal mechanisms. To prevent leakage of the light irradiated in the cover 2, even when the exhaust port 22 and a window are disposed, it is desirable to make the sizes of those as small as possible. The cover 2 is configured by material capable of blocking light irradiated therein, for example, light of various wavelengths such as ultraviolet ray, visible light, and infrared ray.

Figure 3:
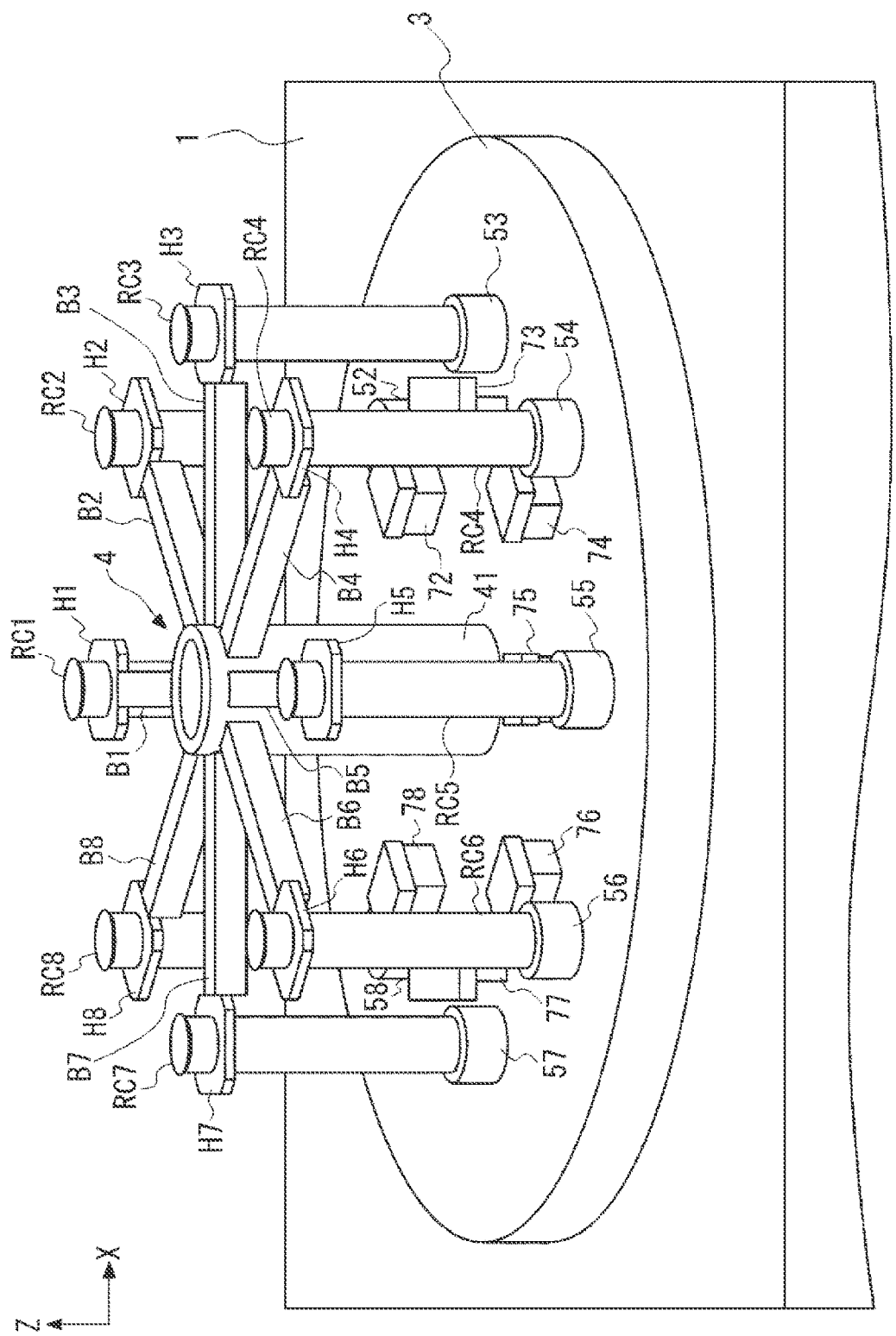
FIG. 3 is a perspective view schematically illustrating an internal configuration of the light irradiation apparatus according to the first exemplary embodiment.
Figure 4:
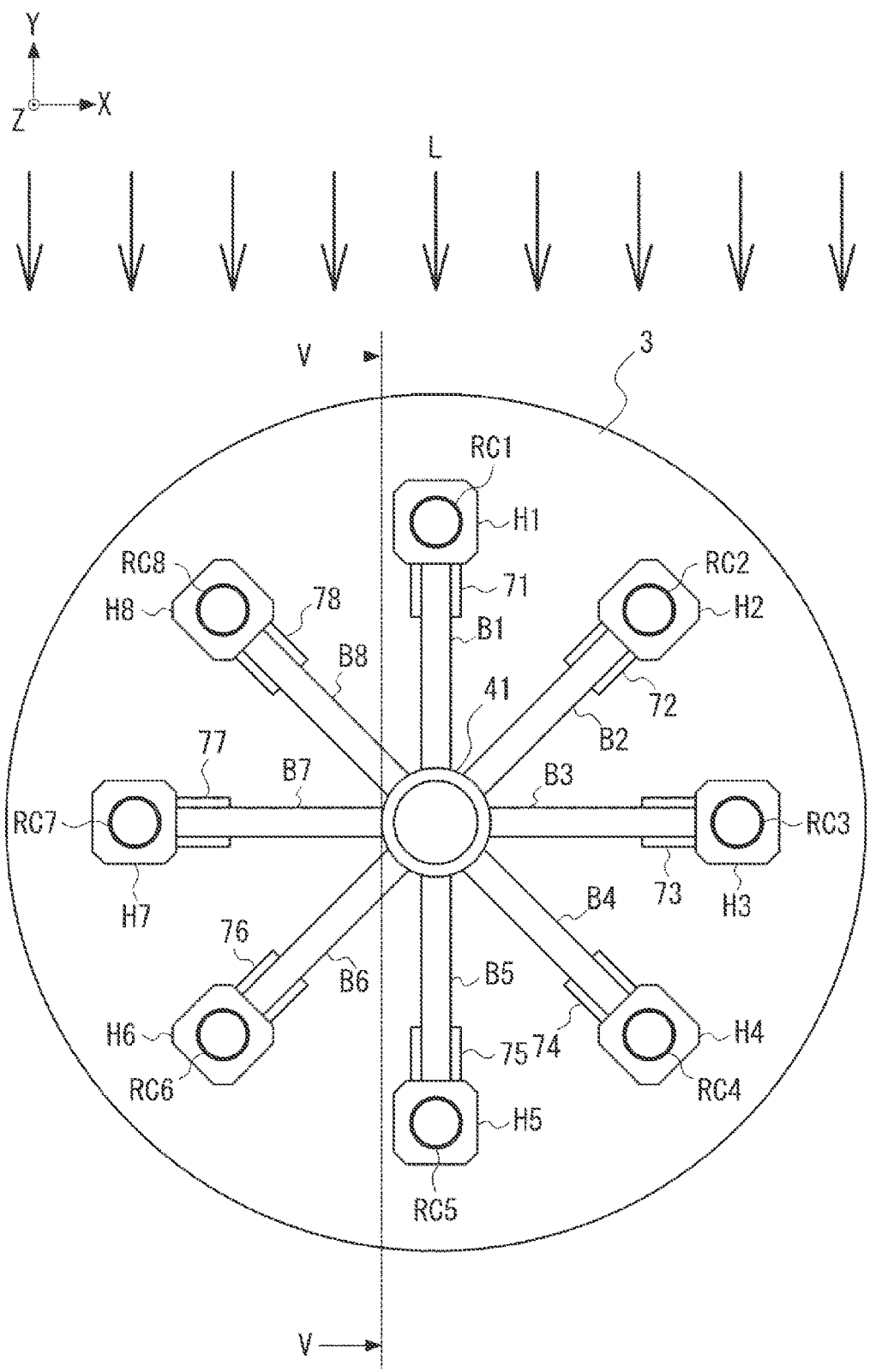
FIG. 4 is a top view schematically illustrating a configuration of the light irradiation apparatus according to the first exemplary embodiment.
Figure 5:
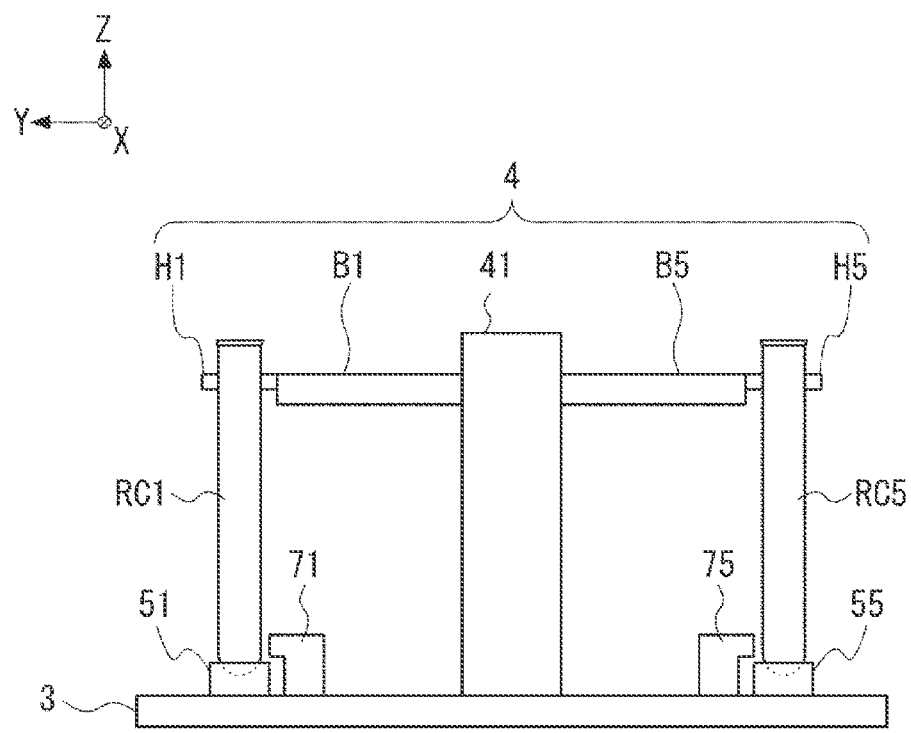
FIG. 5 schematically illustrates the configuration of the light irradiation apparatus according to the first exemplary embodiment when observed from a V-V line in FIG. 4.

FIG. 3 is a perspective view schematically illustrating an internal configuration of the light irradiation apparatus 100. FIG. 4 is a top view schematically illustrating a configuration of the light irradiation apparatus 100. FIG. 5 schematically illustrates the configuration of the light irradiation apparatus 100 when observed from a V-V line in FIG. 5. In FIG. 4, to facilitate understanding of the internal configuration of the light irradiation apparatus 100, the cover 2 and the light irradiation mechanism are omitted. Hereinafter, a direction approximately from left to right on a plane of FIG. 1, a direction approximately from right to left on a plane of FIG. 2, a horizontal direction from left to right on planes of FIGS. 3 and 4, and a direction from front to back and normal to a plane of FIG. 5 are an X-direction. A direction approximately from front to back of the planes of FIGS. 1 and 3, a direction approximately from back to front of the planes of FIG. 2, a vertical direction from bottom to top of the plane of FIG. 4, and a horizontal direction from right to left of the plane of FIG. 5 are a Y-direction. A vertical direction from bottom to top of the planes of FIGS. 1 to 3, and 5, and a direction from front to back and normal to the plane of FIG. 4 are a Z-direction.

A rotating stage 3 whose principal surface is an X-Y plane is disposed on the pedestal 1. The rotating stage 3 can rotate around an axis (Also referred to as a first axis) that is parallel to the Z-direction and passes through the center of the rotating stage 3. Although not illustrated in the drawings, a drive unit such as a motor fixed on the pedestal 1 and connected to a center axis of the rotating stage 3 is disposed under the rotating stage 3, and the rotating stage 3 rotates at a predetermined speed by being driven by the drive unit.

A holding mechanism 4 holding a plurality of reaction vessels is disposed on the rotating stage 3. The reaction vessel used in the present exemplary embodiment has a circular cross-section in the X-Y plane and is a vessel having a cylindrical part whose longitudinal direction is a direction (Z-direction) of a central axis (Also referred to as a second axis) of the circular cross-section. Various vessels such as a test tube and a vial container that are a cylindrical vessel whose one end in the longitudinal direction is closed can be used as the reaction vessel. Various flasks having a cylindrical-shaped neck can be also used as the reaction vessel, for example. Hereinbelow, a case in which eight reaction vessels RC1 to RC8 are used will be described.

The holding mechanism 4 includes a column 41, beams B1 to B8, and holders H1 to H8. The column 41 is a rod-shape member or cylindrical-shaped member, and is disposed on the rotating stage 3 to cause the central axis thereof in the Z-direction to match the rotation axis of the rotating stage 3. The eight beams B1 to B8 radially extend from the rotating stage 3 at equal intervals of 45 degrees. The holders H1 to H8 holding the reaction vessels RC1 to RC8 are disposed at the tips of the beams B1 to B8, respectively. The holders H1 to H8 are configured as members that can rotatably hold the reaction vessels RC1 to RC8, respectively. For example, the holders H1 to H8 are configured as members respectively having holes through which the reaction vessels RC1 to RC8 can be inserted and thereby the reaction vessels RC1 to RC8 can be held.

Note that, in FIG. 4, to facilitate understanding of the configuration, only the configuration regarding the reaction vessels RC1 and RCS is illustrated.

The bottom of the reaction vessel held by the holding mechanism 4 is held by the rotation mechanism. In this example, rotation mechanisms 51 to 58 hold the bottoms of the reaction vessels RC1 to RC8, respectively. That is, in the top view, the rotation mechanisms 51 to 58 are disposed at positions overlapping with the holders H1 to H8, respectively. The rotation mechanisms 51 to 58 are pillar-shaped members, and each can rotate around the central axis thereof in the Z-direction. Although not illustrated in the drawings, drive units such as motors fixed to the rotating stage 3 and connected to the center axes of the rotation mechanisms 51 to 58 are disposed under the rotating stage 3, and the rotation mechanisms 51 to 58 rotate at the predetermined speed by being driven by the drive units. Since the bottoms of the reaction vessels RC1 to RC8 are respectively contacted with and held by the rotation mechanisms 51 to 58, when the rotation mechanisms 51 to 58 rotate, the reaction vessels RC1 to RC8 also rotate, that is, rotate around own axes, respectively.

The relative positional relationship between the rotating stage 3, the holding mechanism 4, and the rotation mechanisms 51 to 58 does not change even when the rotating stage 3 rotates. Therefore, when the rotating stage 3 rotates, the reaction vessels RC1 to RC8 also rotate, that is, revolve around the central axis of the rotating stage 3, respectively.

Figure 6:
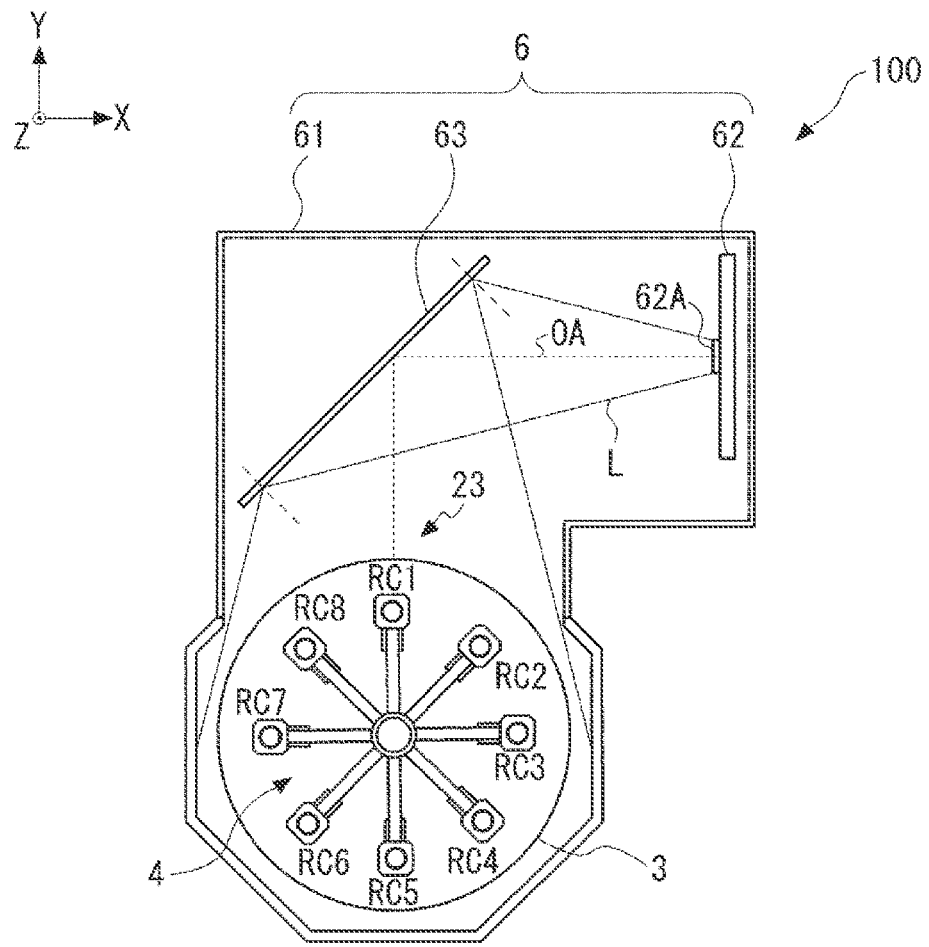
FIG. 6 is a top view schematically illustrating a configuration of a light irradiation mechanism.

The light irradiation mechanism 6 is connected to an opening 23 disposed on a +Y-side of the cover 2. FIG. 6 is a top view schematically illustrating a configuration of the light irradiation mechanism 6. The light irradiation mechanism 6 includes a cover 61, a light source unit 62, and a mirror 63. The cover 61 is disposed on the pedestal 1 and can be fixed to the pedestal 1 by fixing means such as a screw. In FIG. 6, to facilitate understanding of the configuration of the light irradiation mechanism 6, a top surface of the cover 61 is omitted.

Figure 7:
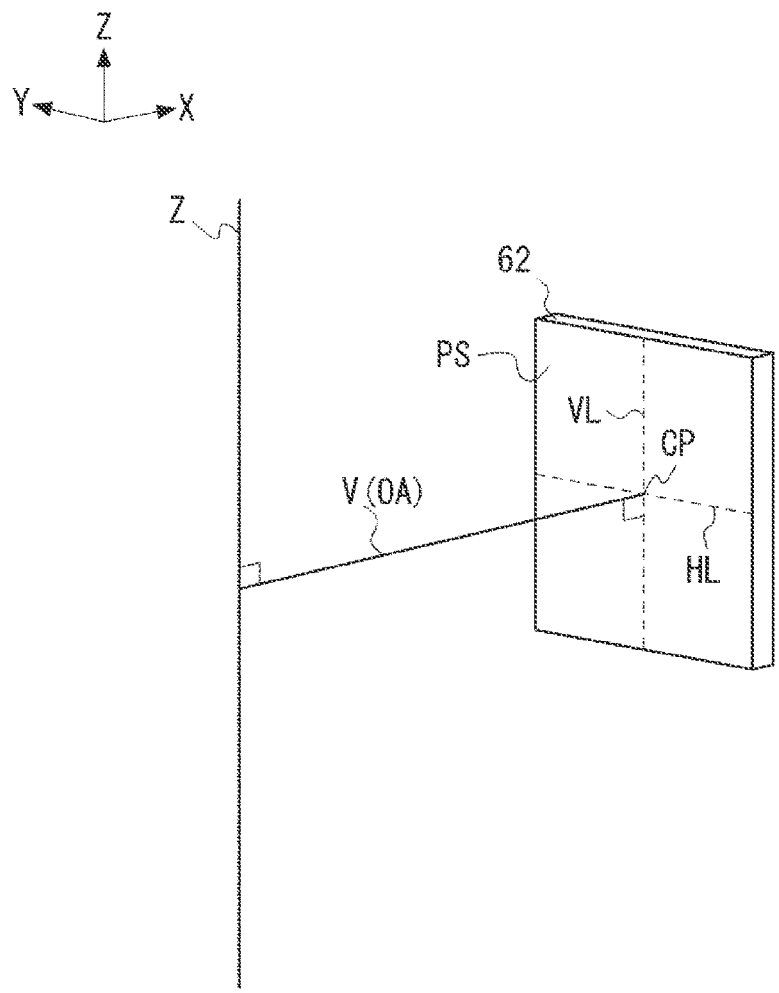
FIG. 7 schematically illustrates a configuration of a light source unit.

The light source unit 62 is configured as a plate-like member standing in the Z-direction on which at least one LED (Light emitting diode) 62A serving as a light source in a position apart from the opening 23 on the pedestal 1. FIG. 7 schematically illustrates a configuration of the light source unit 62. The light source unit 62 is placed to cause a principal surface thereof on which the at least one LED 62A to face a direction orthogonal to the Z-direction. In other words, the light source unit 62 is configured to cause a normal line V of a principal surface PS passing through a center CP of the principal surface PS to be orthogonal to the Z-direction.

It is desirable that the LED is arranged in such a manner that a normal line of a light-emitting face is parallel to the normal line V of the principal surface PS. Further, it is desirable that the LED is arranged on a vertical line VL (Also referred to as a third axis) passing through the center CP of the principal surface PS and parallel to the Z-direction. When disposing two or more LEDs, it is desirable that the LEDs are arranged in a line on the vertical line VL of the principal surface PS. Thus, the two or more LEDs can irradiate the lights to the adjacent reaction vessels in the same manner.

Further, the two or more LEDs may be arranged in a line on a horizontal line HL (Also referred to as a fourth axis) orthogonal to the vertical line VL on the principal surface PS. In this case, to equalize lights irradiated from two areas divided by the vertical line VL, it is desirable that the two or more LEDs are symmetrically arranged with respect to the vertical line VL.

It should be appreciated that the LEDs may be two-dimensionally arranged in the direction of the horizontal line HL and the direction of the vertical line VL, that is, may be arranged in a matrix.

Wavelengths of the two or more LEDs may be the same as or different from each other. The two or more LEDs may constitute two or more groups of LEDs and each group may include a predetermined number of the same wavelength LEDs.

As described above, the light-emitting face of the LED faces in the direction of the normal line V, and a center of a beam of a light L emitted by the entire light source unit 62 is the center CP of the light source unit 62. A direction passing through the center CP of the light source unit 62 and parallel to the normal line V is referred to as an optical axis OA. The optical axis OA is not normally fixed to this direction, and it should be appreciated that the direction of the optical axis OA is deflected by the propagating light being deflected by various optical elements.

The light L emitted from the light source unit 62 is incident on the mirror 63 disposed on the optical axis OA. The mirror 63 reflects the light L and irradiates the light L to the reaction vessels RC1 to RC8 through the opening 23.

Here, the rotation and revolution of the reaction vessel will be further described. In the present exemplary embodiment, it is desirable that the reaction vessel rotates around the axis thereof so that the position closest to the opening 23 changes each time the reaction vessel revolves. As a result, since the position closest to the opening 23 on the side surface of the reaction vessel RC, that is, the position where an optical path to the light source unit 62 is the shortest, changes each revolution, it is possible to irradiate the light L to the side surface of the reaction vessel RC more equally.

Therefore, it is desirable that a revolution period $T_{REV}$ of the reaction vessel is determined not to be a multiple of a rotation period $T_{ROT}$. Thus, it is possible to prevent the same position on the side surface of the reaction vessel RC from being closest to the opening 23 at every revolution.

Further, it is desirable that the revolution period $T_{REV}$ of the reaction vessel is determined not to be a multiple of the rotation period $T_{ROT}$ and a value adding 0.5 to the multiple. Thus, it is possible to prevent a first position on the side surface of the reaction vessel RC and a second position opposing to the first position with the central axis of the reaction vessel interposed therebetween from being alternately closest to the opening 23 at every revolution.

Furthermore, it is desirable that a revolution period $T_{REV}$ of the reaction vessel is determined to cause a value obtained by dividing the revolution period $T_{REV}$ by the rotation period $T_{ROT}$ to be an irrational number. Thus, the position closest to the opening 23 on the side surface of the reaction vessel RC can be made random at each revolution.

Note that it should be appreciated the rotation periods of the reaction vessels RC1 to RC8 may be the same as and different from each other.

As described above, according to the present configuration, it is possible to equally irradiate the light to each reaction vessel from two or more directions. Since each reaction vessel revolves and rotates in the same manner, it is possible to cause light irradiation states on the reaction vessels to be equalized. Thus, experimental environments in respective reaction vessels can be averaged.

Figure 8:
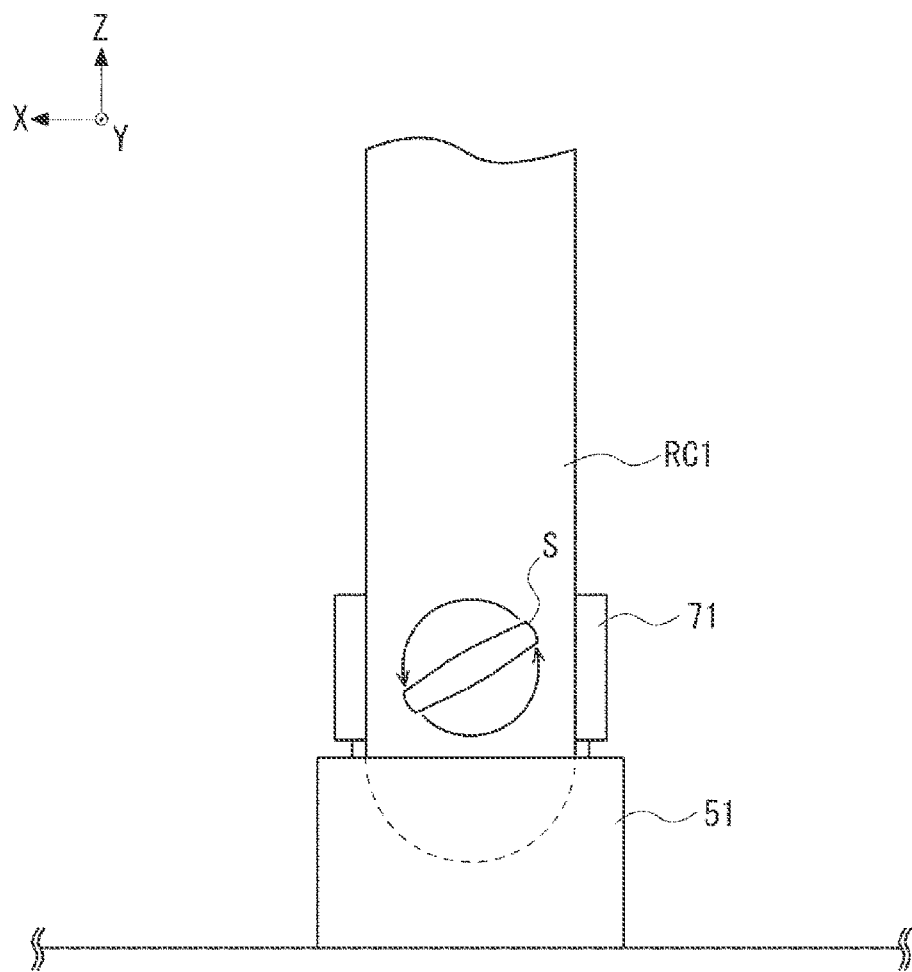
FIG. 8 illustrates a rotation of a stir bar in a reaction vessel.

Subsequently, the configuration of the light irradiation apparatus 100 will be described. A plurality of stirring mechanisms rotating stir bars placed in the reaction vessels are disposed on the rotating stage 3. In this example, stirring mechanisms 71 to 78 are placed near the rotation mechanisms 51 to 58, respectively. The stirring mechanisms 71 to 78 rotate stir bars S on the bottoms of the reaction vessels RC1 to RC8 by magnetic force around rotation axes orthogonal to the central axes of the reaction vessels RC1 to RC8, respectively. FIG. 8 illustrates the rotation of the stir bar S in the reaction vessel RC1. As illustrated in FIG. 8, the stir bar S on the bottom of the reaction vessel RC1 rotates around the Y-direction orthogonal to the central axis of the reaction vessel RC1 (Z-direction) by the stirring mechanism 71. Regarding the rotation of the stir bar, the same applies to the stirring mechanisms 72 to 78.

As described above, the light-irradiation multi-sample parallel-reaction apparatus of "Photocatalytic Reaction Apparatus" has a stirrer function for rotating the stir bar in the reaction vessel. However, this stirrer function is a general one for rotating the stir bar around the central axis of the reaction vessel. Thus, when the sample includes water insoluble powder, the powder settles on the bottom of the reaction vessel and the sample cannot be stirred.

In contrast, according to the present configuration, since the stir bar can be stirred around the rotation axis orthogonal to the central axis of the reaction vessel, the sample can be stirred in the longitudinal direction (Vertical direction) of the reaction vessel. Thus, even when the sample includes the powder, the stirring can be efficiently performed without settling of the powder. Therefore, it is possible to efficiently perform chemical reactions to which the powder relates.

As described above, according to the present configuration, by providing the light irradiation mechanism of the simple configuration including one light source unit, it is possible to irradiate the light to the reaction vessels. Since the light irradiation mechanism is disposed at the position apart from the rotating stage and the holding mechanism, it is advantageous in that the light irradiation mechanism can be easily attached, replaced, maintained, and wired.

Further, according to the present configuration, the number of the reaction vessels, the number of the rotation mechanisms, and the number of the stirring mechanisms are not limited to eight, and they are merely examples. Any number at least two of the reaction vessels, any number at least two of the rotation mechanisms, and any number at least two of the stirring mechanisms may be disposed. According to the present configuration, design of the light irradiation mechanism can be easily changed corresponding to the numbers of the reaction vessels, the rotation mechanisms, and the stirring mechanisms. Therefore, when only a small number of reaction vessels, rotation mechanisms, and stirring mechanisms are provided, the light irradiation mechanism can be easily downsized. Therefore, it can be understood that the present configuration is advantageous from the viewpoint of achieving the miniaturization of the entire light irradiation apparatus.

Further, according to the present configuration, since the LED is used as an illumination light source, heat generation can be reduced as compared to the mercury lamp. Thus, it is possible to keep the experimental environment in the reaction vessel at a more constant temperature by air cooling. Further, it is possible to miniaturize the mechanism for cooling and thus to miniaturize to the light irradiation apparatus 100.

Second Exemplary Embodiment

Figure 9:
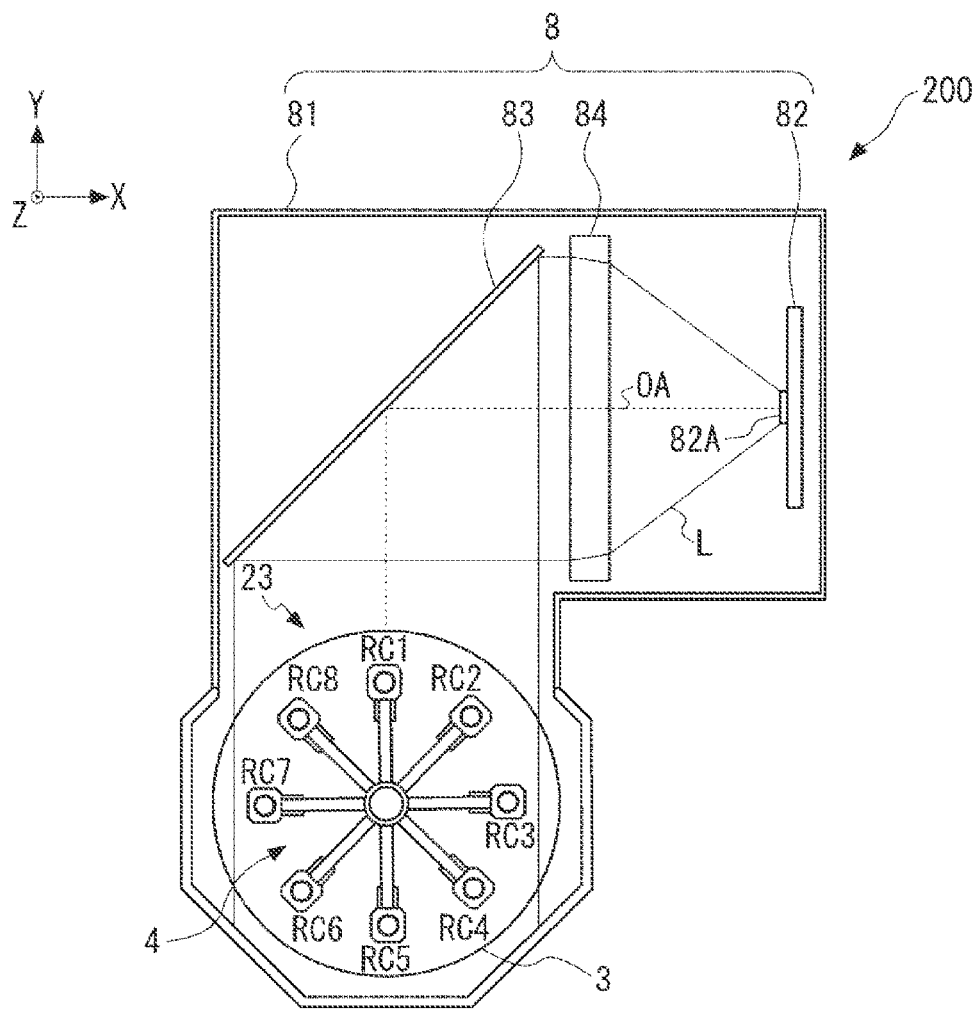
FIG. 9 is a top view schematically illustrating a configuration of a light irradiation apparatus according to a second exemplary embodiment.

A light irradiation apparatus 200 according to a second exemplary embodiment will be described. FIG. 9 is a top view schematically illustrating a configuration of the light irradiation apparatus 200 according to the second exemplary embodiment. The light irradiation apparatus 200 has a configuration in which the light irradiation mechanism 6 in the light irradiation apparatus 100 according to the first exemplary embodiment is replaced with a light irradiation mechanism 8.

The light irradiation mechanism 8 includes a cover 81, a light source unit 82, a mirror 83, and a collimator 84. The cover 81, the light source unit 82, and the mirror 83 correspond to the cover 61, the light source unit 62, and the mirror 63 in the light irradiation mechanism 6, respectively. In FIG. 8, to facilitate understanding of the configuration of the light irradiation mechanism 8, a top surface the cover 81 is omitted.

The collimator 84 are inserted between the light source unit 82 and the mirror 83. The collimator 84 converts the light L emitted from a LED 82A disposed in the light source unit 82 to a predetermined range into a parallel light, and the parallel light is incident on the mirror 83 disposed on the optical axis OA. The mirror 83 reflects the light L that is the parallel light and irradiates the light L to the reaction vessels RC1 to RC8 through the opening 23.

As described above, according to the present embodiment, it is possible to irradiate the light emitted from the light source unit 82 to the reaction vessels more efficiently and with higher illuminance. Further, since the parallel light can be irradiated, it is also possible to reduce the difference in illuminance due to the difference in the position of the reaction vessel in the optical axis direction (Y-direction).

Other Exemplary Embodiments

Note that the present disclosure is not limited to the exemplary embodiments mentioned above and can be modified as appropriate without departing from the gist of the present disclosure. For example, although the configuration in which the eight reaction vessels, the eight rotation mechanisms, and the eight stirring mechanisms are disposed has been described in the exemplary embodiment described above, it is merely an example. Any number at least two of the reaction vessels, any number at least two of the rotation mechanisms, and any number at least two of the stirring mechanisms may be disposed. In this case, M reaction vessels are located at positions on the circumstances separated at equal intervals of 360/M degrees, where M is an integer of two or more. Likewise, M rotation mechanisms and M stirring mechanisms are located at the positions on the circumstances separated at the equal intervals of 360/M degrees.

Although the configuration in which four light irradiation mechanisms are disposed has been described in the exemplary embodiment described above, it is merely an example. In this case, any number at least two of the light irradiation mechanisms may be disposed. It is desirable that N light irradiation mechanisms are located at positions on the circumstances separated at equal intervals of 360/N degrees, where N is an integer of two or more.

Although the configuration in which the stirring mechanisms 71 to 78 are disposed on the side of the column 41 when observed from the reaction vessels RC1 to RC8 has been described in the exemplary embodiment described above, it is merely an example. As long as the stir bar S can be rotated around the direction orthogonal to the central axis of the reaction vessel, the stirring mechanisms 71 to 78 may be located at any positions in the vicinity of the reaction vessels RC1 to RC8, respectively.

The rotation mechanisms 51 to 58 may have functions of drive units of magnetic stirrer to cause the stir bars S on the bottoms of the reaction vessels RC1 to RC8 around the central axes of the reaction vessels RC1 to RC8 by magnetic force, respectively. Thus, it is also possible to rotate the stir bars S around the rotation axes of the directions different from those of the stirring mechanisms 71 to 78.

Although the rod-shaped stir bar having the circular cross section has been illustrated as the stir bar S in FIG. 8 in the exemplary embodiment described above, it is merely an example. Various stir bars such as an oval-shaped or football-shaped stir bar, a triangle stir bar having a triangle cross section, a disc-shaped stir bar (e.g. cross head stir bar), rod-shaped stir bar having another cross section (e.g. octagon stir bar), and a cross stir bar bay be used as the stir bar S.

Other optical components such as a fly eye lens, a beam expander, an aperture, a polarizing filter, and a wavelength filter may be inserted into the light irradiation mechanism.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A light irradiation apparatus comprising:
   a rotating stage configured to be rotatable around a first axis that is a central axis thereof;
   a holder that holds a plurality of reaction vessels on a circumference around the first axis on the rotating stage at equal intervals, a longitudinal direction of the reaction vessels being a direction of the central axis;
   a plurality of rotating pillar-shaped members that hold bottoms of the reaction vessels and rotate the reaction vessels around second axes that are central axes of the reaction vessels, respectively; and
   a light irradiator that is arranged outside an outer circumference of the rotating stage and configured to irradiate a light emitted from at least one light emitting diode outside the outer circumference of the rotating stage to the reaction vessels from a predetermined direction.

2. The light irradiation apparatus according to claim 1, wherein
   the light irradiator comprises:
      a light source unit in which the at least one light emitting diode is disposed; and
      a mirror configured to reflect the light emitted from the light source unit and irradiate the reflected light to the reaction vessels.

3. The light irradiation apparatus according to claim 2, wherein the light irradiator further comprises a collimator configured to convert the light emitted from the light source unit into a parallel light and output the parallel light to the mirror.

4. The light irradiation apparatus according to claim 2, wherein
   the at least one light emitting diode is disposed on a principal surface of the light source unit; and
   an optical axis of the light emitted from the light source unit matches a normal line passing through a center of the principal surface of the light source unit.

5. The light irradiation apparatus according to claim 4, wherein two or more light emitting diodes are arranged on a third axis passing through the center and parallel to the first axis on the principal surface in the light source unit.

6. The light irradiation apparatus according to claim 5, wherein the two or more light emitting diodes are symmetrically arranged with respect to the third axis and arranged on a fourth axis passing through the center of the principal surface and orthogonal to the third axis in the light source unit.

7. The light irradiation apparatus according to claim 6, wherein the two or more light emitting diodes are arranged in a matrix in a direction of the third axis and a direction of the fourth axis in the light irradiator.

8. The light irradiation apparatus according to claim 5, wherein
   when the two or more light emitting diodes are disposed in the light irradiator,
   emission wavelengths of the two or more light emitting diodes are the same as each other,
   emission wavelengths of the two or more light emitting diodes are different from each other, or
   the two or more light emitting diodes constitute a plurality of groups of light emitting diodes, the light emitting diodes included in each group having the same emission wavelength, emission wavelengths of the groups being different from each other.

9. The light irradiation apparatus according to claim 1, wherein
   each reaction vessel revolves as the rotating stage rotates, and
   a revolution period is set to a value that is not a multiple of a rotation period.

10. The light irradiation apparatus according to claim 9, wherein the revolution period is set to a value other than a value obtained by adding 0.5 to the multiple of the rotation period.

11. The light irradiation apparatus according to claim 10, wherein the revolution period is set to a value of an irrational number obtained by dividing the value by the rotation period.

* * * * *